(12) United States Patent
Weinkötz et al.

(10) Patent No.: US 10,421,256 B2
(45) Date of Patent: *Sep. 24, 2019

(54) METHOD FOR PRODUCING SINGLE OR MULTI-LAYERED LIGNOCELLULOSE MATERIALS BY HARDENING IN A HIGH FREQUENCY ELECTRIC FIELD

(71) Applicant: BASF SE, Ludwigshafen (DE)

(72) Inventors: Stephan Weinkötz, Neustadt (DE); Detlef Krug, Dresden (DE); Marco Mäbert, Klipphausen (DE)

(73) Assignee: BASF SE (DE)

( * ) Notice: Subject to any disclaimer, the term of this patent is extended or adjusted under 35 U.S.C. 154(b) by 212 days.

This patent is subject to a terminal disclaimer.

(21) Appl. No.: 15/534,181

(22) PCT Filed: Dec. 9, 2015

(86) PCT No.: PCT/EP2015/079050
§ 371 (c)(1),
(2) Date: Jun. 8, 2017

(87) PCT Pub. No.: WO2016/091918
PCT Pub. Date: Jun. 16, 2016

(65) Prior Publication Data
US 2017/0361580 A1 Dec. 21, 2017

(30) Foreign Application Priority Data

Dec. 9, 2014 (EP) .................................. 14197060

(51) Int. Cl.
*B32B 21/08* (2006.01)
*C08F 212/08* (2006.01)
(Continued)

(52) U.S. Cl.
CPC .............. *B32B 21/08* (2013.01); *B27N 3/005* (2013.01); *B27N 3/18* (2013.01); *B27N 3/24* (2013.01);
(Continued)

(58) Field of Classification Search
CPC ... B32B 21/02; B32B 21/08; B32B 2262/067; B32B 2264/065; B32B 2260/046;
(Continued)

(56) References Cited

U.S. PATENT DOCUMENTS 3,649,396 A 3/1972 Carlsson
3,668,286 A * 6/1972 Brooks ................... B27N 3/08
162/13

(Continued)

FOREIGN PATENT DOCUMENTS

CA 2821159 A1 6/2012
CA 2854701 A1 6/2013
(Continued)

OTHER PUBLICATIONS

European Search Report for Application No. 14197060.8, dated Jul. 24, 2015.
(Continued)

*Primary Examiner* — Christopher M Rodd
(74) *Attorney, Agent, or Firm* — Drinker Biddle & Reath LLP

(57) ABSTRACT

The present invention relates to a process for the batchwise or continuous, preferably continuous production of single-layer lignocellulose-based boards or of multilayer lignocellulose-based boards with a core and with at least one upper and one lower outer layer,
comprising the following steps:
a) mixing of the components of the individual layer(s),
b) layer-by-layer scattering of the mixtures to give a mat,
c) compaction after the scattering of the individual layer(s),
d) application of a high-frequency electrical field, during and/or after the compaction and thermal hardening of the binder(s),
e) then optionally hot pressing, and
f) cooling the lignocellulose material,
where, in step a),
for the core or the single layer, the lignocellulose particles A) [component A)] are mixed with
B) from 0 to 25% by weight of expanded plastics particles with bulk density in the range from 10 to 150 kg/m$^3$ [component B)],
C) from 1 to 15% by weight of one or more binders selected from the group consisting of aminoplastic resin and organic isocyanate having at least two isocyanate groups [component C)],
D) from 0 to 3% by weight of ammonium salts [component D)],
E) from 0 to 5% by weight of additives [component E)] and
F) from 0.1 to 3% by weight of alkali metal salts or alkaline earth metal salts from the group of the sulfates, nitrates, halides and mixtures of these [component F)],
and optionally for the outer layers, the lignocellulose particles G) [component G)] are mixed with
H) from 1 to 15% by weight of one or more binders selected from the group consisting of aminoplastic resin and organic isocyanate having at least two isocyanate groups [component H)],
I) from 0 to 2% by weight of ammonium salts [component I)],
J) from 0 to 5% by weight of additives [component J)] and
K) from 0.1 to 3% by weight of alkali metal salts or alkaline earth metal salts from the group of the sulfates, nitrates, halides and mixtures of these [component K)],
wherein at the juncture Z the temperature of the layer of the core or of the single layer is more than 90° C., and this temperature is reached in less than 40 s/mm·d after the (Continued)

application of the high-frequency electrical field, where d is the thickness of the sheet of lignocellulose material at the juncture Z.

20 Claims, No Drawings

(51) Int. Cl.
 *C08L 97/02* (2006.01)
 *B27N 3/18* (2006.01)
 *B27N 3/24* (2006.01)
 *B32B 21/02* (2006.01)
 *B27N 3/00* (2006.01)

(52) U.S. Cl.
 CPC ............ *B32B 21/02* (2013.01); *C08F 212/08* (2013.01); *C08L 97/02* (2013.01); *B32B 2260/046* (2013.01); *B32B 2262/067* (2013.01); *B32B 2264/065* (2013.01)

(58) Field of Classification Search
 CPC ....... C08L 97/02; C08F 212/08; B27N 3/005; B27N 3/18; B27N 3/24
 See application file for complete search history.

(56) References Cited

U.S. PATENT DOCUMENTS

| | | | |
|---|---|---|---|
| 3,933,875 A | | 1/1976 | Brose et al. |
| 4,336,174 A | * | 6/1982 | Sanfilippo .............. B29C 33/62 428/528 |
| 4,420,357 A | | 12/1983 | Neubauer et al. |
| 5,112,875 A | | 5/1992 | Zimmermann et al. |
| 5,913,990 A | | 6/1999 | Kramer |

FOREIGN PATENT DOCUMENTS

| | | |
|---|---|---|
| CH | 583273 A5 | 12/1976 |
| DE | 3107592 A1 | 9/1982 |
| DE | 2908470 C2 | 9/1983 |
| DE | 3107589 C2 | 1/1986 |
| DE | 4412515 A1 | 10/1995 |
| DE | 10315922 A1 | 11/2004 |
| DE | 102006028392 A1 | 12/2007 |
| EP | 2699396 A1 | 2/2014 |
| WO | WO-9201540 A1 | 2/1992 |
| WO | WO-9728936 A1 | 8/1997 |
| WO | WO-2009080748 A1 | 7/2009 |
| WO | WO-2012080338 A1 | 6/2012 |
| WO | WO-2012143907 A1 | 10/2012 |
| WO | WO-2013092817 A1 | 6/2013 |

OTHER PUBLICATIONS

Pereira, C., et al., "High frequency heating of medium density fiberboard (MDF): theory and experiment", Chemical Engineering Science, 2004, vol. 59, No. 4, pp. 735-745.
U.S. Appl. No. 15/534,223, filed Jun. 8, 2017.
International Preliminary Examination Report (in German) for PCT/EP2015/078810 dated Nov. 9, 2016.
International Preliminary Examination Report with Applicant Amended Claims (in German) for PCT/EP2015/079050 dated Nov. 11, 2016.
International Search Report for PCT/EP2015/078810 dated Mar. 15, 2016.
International Search Report for PCT/EP2015/079050 dated Mar. 16, 2016.

* cited by examiner

METHOD FOR PRODUCING SINGLE OR MULTI-LAYERED LIGNOCELLULOSE MATERIALS BY HARDENING IN A HIGH FREQUENCY ELECTRIC FIELD

CROSS-REFERENCE TO RELATED APPLICATIONS

This application is a national stage application (under 35 U.S.C. § 371) of PCT/EP2015/079050, filed Dec. 9, 2015, which claims benefit of European Application No. 14197060.8, filed Dec. 9, 2014, both of which are incorporated herein by reference in their entirety.

The present invention relates to a process for the production of single- or multilayer lignocellulose materials by hardening in a high frequency electric field.

WO-A-97/28936 discloses that lignocellulose-containing particles are scattered to give a mat which is then precompacted, heated during precompaction by means of high-frequency energy and finally, in a hot press, pressed to give a sheet. This process has the disadvantage that for the final compaction to give the finished wood-based board a further compaction step in a heated press is required in addition to the precompaction step which uses high-frequency heating.

DE-C-31 07 589 discloses a device which can be used for the high-frequency preheating of a mat made of glued wood fibers during the production of wood-fiber board. The high-frequency heating equipment heats the mat to from 40 to 80° C. The mat is then finally pressed in a heated press.

DE-C-29 08 470 discloses a device for the batchwise production of particle board or fiberboard which has high-frequency heating installed in a manner such that before scattering of the mat is complete (only the lower outer layer and the middle layer having been scattered at the juncture of energy introduction) said mat is heated during the return procedure of the scattering unit during the pressing of a preceding nonwoven section. The energy here is mainly introduced into the middle layer. The upper outer layer is then scattered thereover. The lower outer layer here serves as insulation. This process has the disadvantage that for the final compaction to give the finished wood-based board a further compaction step in a heated press is required in addition to the precompaction step which uses high-frequency heating.

DE-A-31 07 592 describes a process for the production of particle board or fiberboard in which, after use of high-frequency energy for the heating of the scattered particle mat or fiber mat, a compaction step is carried out with introduction of further heat in a heated press.

All of these processes have technical disadvantages.

The following has accordingly been found:

A new and improved process for the batchwise or continuous, preferably continuous production of single-layer lignocellulose-based boards or of multilayer lignocellulose-based boards with a core and with at least one upper and one lower outer layer, comprising the following steps:
a) mixing of the components of the individual layer(s),
b) layer-by-layer scattering of the mixtures to give a mat,
c) compaction after the scattering of the individual layer(s),
d) application of a high-frequency electrical field during and/or after the compaction and thermal hardening of the binder(s),
e) then optionally hot pressing, and
f) cooling the lignocellulose material,
  where, in step a),
  for the core or the single layer, the lignocellulose particles
  A) [component A)] are mixed with
  B) from 0 to 25% by weight of expanded plastics particles with bulk density in the range from 10 to 150 kg/m$^3$ [component B)],
  C) from 1 to 15% by weight of one or more binders selected from the group consisting of aminoplastic resin and organic isocyanate having at least two isocyanate groups [component C)],
  D) from 0 to 3% by weight of ammonium salts [component D)],
  E) from 0 to 5% by weight of additives [component E)] and
  F) from 0.1 to 3% by weight of alkali metal salts or alkaline earth metal salts from the group of the sulfates, nitrates, halides and mixtures of these [component F)],
  and optionally for the outer layers, the lignocellulose particles G) [component G)] are mixed with
  H) from 1 to 15% by weight of one or more binders selected from the group consisting of aminoplastic resin and organic isocyanate having at least two isocyanate groups [component H)],
  I) from 0 to 2% by weight of ammonium salts [component I)],
  J) from 0 to 5% by weight of additives [component J)] and
  K) from 0.1 to 3% by weight of alkali metal salts or alkaline earth metal salts from the group of the sulfates, nitrates, halides and mixtures of these [component K)],
  wherein at the juncture Z the temperature of the layer of the core or of the single layer is at least 90° C., and this temperature is reached in less than 40 s/mm·d after the application of the high-frequency electrical field, where d is the thickness of the sheet of lignocellulose material at the juncture Z, single- or multilayer lignocellulose materials produced by a process for the batchwise or continuous, preferably continuous production of single-layer lignocellulose-based boards or of multilayer lignocellulose-based boards with a core and with at least one upper and one layer outer layer, comprising the following steps:
a) mixing of the components of the individual layer(s),
b) layer-by-layer scattering of the mixtures to give a mat,
c) compaction after the scattering of the individual layer(s),
d) application of a high-frequency electrical field during and/or after the compaction and thermal hardening of the binder(s),
e) then optionally hot pressing, and
f) cooling the lignocellulose material,
  where, in step a),
  for the core or the single layer, the lignocellulose particles
  A) [component A)] are mixed with
  B) from 0 to 25% by weight of expanded plastics particles with bulk density in the range from 10 to 150 kg/m$^3$ [component B)],
  C) from 1 to 15% by weight of one or more binders selected from the group consisting of aminoplastic resin and organic isocyanate having at least two isocyanate groups [component C)],
  D) from 0 to 3% by weight of ammonium salts [component D)],
  E) from 0 to 5% by weight of additives [component E)] and
  F) from 0.1 to 3% by weight of alkali metal salts or alkaline earth metal salts from the group of the sulfates, nitrates, halides and mixtures of these [component F)],
  and optionally for the outer layers, the lignocellulose particles G) [component G)] are mixed with
  H) from 1 to 15% by weight of one or more binders selected from the group consisting of aminoplastic resin and organic isocyanate having at least two isocyanate groups [component H)], I) from 0 to 2% by weight of ammonium salts [component I)],
J) from 0 to 5% by weight of additives [component J)] and
K) from 0.1 to 3% by weight of alkali metal salts or alkaline earth metal salts from the group of the sulfates, nitrates, halides and mixtures of these [component K)], wherein at the juncture Z the temperature of the layer of the core or of the single layer is at least 90° C., and this temperature is reached in less than 40 s/mm·d after the application of the high-frequency electrical field, where d is the thickness of the sheet of lignocellulose material at the juncture Z, and also single- or multilayer lignocellulose materials with a core and optionally with at least one upper and one lower outer layer, where the core or the single layer comprises, based on the lignocellulose particles A) [component A)], the following components:

G) from 0 to 25% by weight of expanded plastics particles with bulk density in the range from 10 to 150 kg/m³ [component B)],
H) from 1 to 15% by weight of one or more binders selected from the group consisting of aminoplastic resin and organic isocyanate having at least two isocyanate groups [component C)],
I) from 0 to 3% by weight of ammonium salts [component D)],
J) from 0 to 5% by weight of additives [component E)] and
K) from 0.1 to 3% by weight of alkali metal salts or alkaline earth metal salts from the group of the sulfates, nitrates, halides and mixtures of these [component F)], and optionally for the outer layers, based on the lignocellulose particles G) [component G)], the following components:

H) from 1 to 15% by weight of one or more binders selected from the group consisting of aminoplastic resin and organic isocyanate having at least two isocyanate groups [component H)],
I) from 0 to 2% by weight of ammonium salts [component I)],
J) from 0 to 5% by weight of additives [component J)] and
K) from 0.1 to 3% by weight of alkali metal salts or alkaline earth metal salts from the group of the sulfates, nitrates, halides and mixtures of these [component K)].

The data relating to the % by weight values for components B) to F) are the weights of the respective components based on the dry weight of the lignocellulose particles A) [component A)]. The data relating to the % by weight values for components H) to K) are the weights of the respective components based on the dry weight of the lignocellulose particles G) [component G)].

In this invention, the dry weight of the lignocellulose particles A) [component A)] and, respectively, of the lignocellulose particles G) means the weight of the lignocellulose particles without the water comprised therein. Another term used for this is absolute dry weight. The weight data for components B) to F), and also for components H) to K), relate to the weight of the respective component without water. If the components are used in aqueous form, i.e. by way of example in the form of aqueous solutions or emulsions, the water is then ignored in the weight data. If by way of example 5 kg of 30% ammonium nitrate solution are used as component I) per 100 kg of lignocellulose particles G) (dry weight), the resultant quantity of ammonium nitrate is 1.5% by weight. In the case of amino plastic resins, the weight is based on solids content. The solids content of amino plastic resins is determined by weighing 1 g of the resin into a weighing dish, drying for 2 hours at 120° C.+/−2° C. in a drying oven and weighing the residue after cooling to room temperature in a desiccator (Zeppenfeld, Grunwald, Klebstoffe in der Holz—and Möbelindustrie [Adhesives in the wood and furniture industry], DRW Verlag, $2^{nd}$ edn., 2005, p. 286).

All layers additionally comprise water which is ignored in the weight data for components A) to K).

The water can derive from the residual moisture comprised in the lignocellulose particles A) and, respectively, G), from the binders C) and, respectively, H), for example if the isocyanate-containing binder takes the form of aqueous emulsion or if aqueous aminoplastic resins are used, from water that is added, for example in order to dilute the binders or in order to moisten the outer layers, from the additives E) and, respectively, J), for example aqueous paraffin emulsions, from the ammonium salts D) and, respectively, I), for example aqueous ammonium salt solutions, or from the expanded plastics particles B) if by way of example steam is used to foam these. It is also possible that water is added independently of the components, e.g. via admixture of water, or spray-application of water. After step a), the water content of the mixture for the core is from 3 to 15% by weight, preferably from 3.5 to 12% by weight, particularly preferably from 4 to 10% by weight, very particularly preferably from 5 to 9% by weight, based on the total dry weight of the mixture of components A) to F). After step a), the water content of the mixture(s) for the outer layers is from 5 to 20% by weight, preferably from 6 to 16% by weight, particularly preferably from 7 to 14% by weight, very particularly preferably from 8 to 13% by weight, based on the total dry weight of the mixture(s) of components G) to K). The water content of the mixtures after step a) is determined by the Darr method (A. Wagenführ, F. Scholz, Taschenbuch der Holztechnik [Wood technology handbook], $2^{nd}$ edn., 2012, Carl Hanser Verlag, p. 84). For this, a sample of the respective mixture is weighed in moist condition ($m_f$=mass, moist) and in Darr-dried condition ($m_d$=mass, Darr-dried). The Darr mass is determined by drying at 103° C. to constant mass. The sample is then cooled in a desiccator, and mass is determined in the Darr-dried condition. Water content is calculated as follows:

$$\text{water content [in \% by weight]} = [(m_f - m_d)/m_d] \cdot 100\%.$$

In the case of the multilayer lignocellulose materials, water content in the mixture(s) for the outer layers is preferably greater than or equal to that in the core. The extent to which water content [in % by weight] in the mixture(s) for the outer layers is greater than that in the core is particularly preferably from 0.5 to 4% by weight, very particularly preferably from 2 to 4% by weight.

The structure of the multilayer lignocellulose materials is as follows:
(1) outer layer (DS-A), the upper outer layer,
(2) core (core-B) and
(3) outer layer (DS-C), the lower outer layer,
where the outer layers DS-A and DS-C respectively can be composed of one or more, i.e. from 1 to 5, preferably from 1 to 3, particularly preferably from 1 to 2, layers of different compositions and the compositions of outer layers DS-A and DS-C are identical or different, preferably identical. In particular, the structure of the multilayer lignocellulose materials is composed of a core and of an upper and a lower outer layer.

The single-layer lignocellulose materials are composed of only one layer, for which the components A) to F) used are the same as those for the core (core-B), and have no outer layers DS-A and DS-C. This single layer of the single-layer lignocellulose materials is likewise termed "core" hereinafter.

The multilayer lignocellulose material can comprise, in addition to the outer layers, further exterior "protective layers", preferably two further exterior layers, i.e. an upper protective layer adjoining the outer layer DS-A (in the case of one layer) or adjoining the uppermost of the upper outer layers DS-A (in the case of a plurality of layers), and a lower protective layer adjoining the outer layer DS-C (in the case of one layer) or adjoining the undermost of the lower outer layers DS-C (in the case of a plurality of layers), where these respectively have any desired composition.

These protective layers are markedly thinner than the outer layers. The ratio by mass of protective layers to outer layers is less than 10:90, preferably less than 5:95. It is very particularly preferable that no protective layers are present.

This single-layer wood-based material can comprise, in addition to the layer core-B, exterior protective layers, preferably two further exterior layers, i.e. an upper protective layer and a lower protective layer which are adjacent to layer core-B and which have any desired composition and any desired dielectric loss.

These protective layers are markedly thinner than the layer of the core. The ratio by mass of protective layers to core-B is less than 5:95, preferably less than 3:97. It is very particularly preferable that no protective layers are present.

In the process of the invention for the production of multilayer lignocellulose materials with a core and with at least one upper and one lower outer layer, and of single-layer lignocellulose materials with a layer which corresponds to the core, the scattered and compacted mat is heated by application of a high-frequency electrical field in the core to a temperature of at least 90° C., i.e. from 90 to 170° C., preferably at least 100° C., i.e. from 100 to 170° C., particularly preferably at least 110° C., i.e. from 110 to 170° C., in particular at least 120° C., i.e. from 120 to 170° C., where this temperature (the final heating temperature) is reached in less than 40 s/mm·d, preferably less than 20 s/mm·d, particularly preferably less than 12.5 s/mm·d, in particular less than 7.5 s/mm·d, very particularly preferably less than 5.5 s/mm·d, measured from the application of the high-frequency electrical field, where d is the thickness of the sheet at the juncture Z. The meaning of the expression "juncture Z" here is the juncture at which heating in the applied high-frequency electrical field has concluded.

In a particular embodiment of the process of the invention for the production of multilayer lignocellulose materials, the core is heated more rapidly than the outer layers. That can be achieved in that the quantities of components D) and F) and the quantities of components I) and K) are selected in a manner that provides compliance with condition 1 and condition 2.

Condition 1

The proportion of component F) based on the dry weight of the lignocellulose particles A) in the mixture of components A) to F) is higher by at least a factor of 1.1 than the proportion of component K) based on the dry weight of the lignocellulose particles G) in the mixture of components G) to K), i.e. component F)≥1.1·component K). If the proportion of component K) in the mixture of components G) to K) is by way of example 1% by weight, the proportion of component F) in the mixture of components A) to F) is then therefore at least 1.1% by weight. The factor by which the proportion of component F) based on the dry weight of lignocellulose particles A) in the mixture of components A) to F) is higher than the proportion of K) based on the dry weight of the lignocellulose particles G) in the mixture of components G) to K) is preferably at least 1.5 times, (i.e. component F)≥3·component K)), particularly preferably at least 3 times (i.e. component F)≥3·component K)), very particularly preferably at least 10 times (i.e. component F)≥10·component K)).

Condition 2

The sum of the proportion of component F) and the proportion of component D) based in each case on the dry weight of the lignocellulose cellulose A) in the mixture of components A) to F) is higher by at least a factor of 1.1 than the sum of the proportion of component K) and the proportion of component I) based in each case on the dry weight of the lignocellulose particles G) in the mixture of components G) to K), i.e. [component F) +component D)]≥1.1·[component K)+component I)]. If the proportion of component K) in the mixture of components G) to K) is by way of example 0.5% by weight and the proportion of component I) is 1.5% by weight, the sum of the proportion of component F) and the proportion of component D) in the mixture of components A) to D) must then therefore be at least 1.1·2% by weight=2.2% by weight (i.e. by way of example proportion of component F)=0.7% by weight and proportion of component D)=1.5% by weight). The factor by which the sum of the proportion of component F) and the proportion of component D) based in each case on the dry weight of the lignocellulose particles A) in the mixture of components A) to F) is higher than the sum of the proportion of component K) and the proportion of component I)–based in each case on the dry weight of the lignocellulose particles G)–in the mixture of components G) to K) is preferably at least 1.5 times (i.e. [component F)+component D)]≥1.5·[component K)+component I)]), particularly preferably at least 3 times (i.e. [component F)+component D)]≥3·[component K)+component I)]), very particularly preferably at least 5 times (i.e. [component F)+component D)]≥5·[component K)+component I)]).

In another particular embodiment of the process of the invention for the production of multilayer lignocellulose materials, the core is heated more slowly than the outer layers. That can be achieved in that the quantities of components D) and F) and the quantities of components I) and K) are selected in a manner that provides compliance with condition 3 and condition 4.

Condition 3

The proportion of component F) based on the dry weight of the lignocellulose particles A) in the mixture of components A) to F) is lower by at least a factor of 1.1 than the proportion of component K) based on the dry weight of the lignocellulose particles G) in the mixture of components G) to K), i.e. component F)≤1.1·component K). The factor by which the proportion of component F) based on the dry weight of lignocellulose particles A) in the mixture of components A) to F) is lower than the proportion of K) based on the dry weight of the lignocellulose particles G) in the mixture of components G) to K) is preferably at least 1.5 times (i.e. component F)≤1.5·component K)), particularly preferably at least 3 times (i.e. component F)≤3·component K)), very particularly preferably at least 10 times (i.e. component F)≤10·component K)).

Condition 4

The sum of the proportion of component F) and the proportion of component D) based in each case on the dry weight of the lignocellulose particles A) in the mixture of components A) to F) is lower by at least a factor of 1.1 than the sum of the proportion of component K) and the proportion of component I) based in each case on the dry weight of the lignocellulose particles G) in the mixture of components G) to K), i.e. [component F)+component D)]≤1.1·[component K)+component I)]. The factor by which the sum of the proportion of component F) and the proportion of component D) based in each case on the dry weight of the lignocellulose particles A) in the mixture of components A) to F) is lower than the sum of the proportion of component K) and the proportion of component I)–based in each case on the dry weight of the lignocellulose particles G)–in the mixture of components G) to K) is preferably at least 1.5 times (i.e. [component F)+component D)]1.5·[component K)+component I)]), particularly preferably at least 3 times (i.e. [component F)+component D)]≤3·[component K)+component I)]), very particularly preferably at least 5 times (i.e. [component F)+component D)]≤5·[component K)+component I)]).

The dielectric loss ε" of the core-B (or the single layer) in the process of the invention after step b) at the same frequency used for the heating in step d) is generally at least 0.008, preferably at least 0.010, particularly preferably at least 0,015, in particular at least 0.020.

The dielectric loss for the layer of the core-B (or the single layer) of the lignocellulose-containing materials after step b) is determined by studying the scattered mixture of components A) to F) in an electrical field.

The dielectrical displacement field is given by $D(\omega)=\varepsilon^*(\omega)E(\omega)$, where $E(\omega)$ is the electrical field of the frequency $\omega$ and $\varepsilon^*(\omega)$ is the complex dielectric constant at the frequency $\omega$. $\varepsilon^*(\omega)$ is a complex variable, and is composed of the factors $\varepsilon_0$ (permativity of vacuum) and $\varepsilon_r^*$ (relative permativity), i.e. $\varepsilon^*(\omega)=\varepsilon_0\varepsilon_r^*$. Complex relative permativity can be described via a real component and an imaginary component: $\varepsilon_r^*=\varepsilon'-i\varepsilon"$, where the dielectric losses, i.e. the conversion of electrical energy into thermal energy, are included by way of the imaginary component ε". ε" is also termed dielectric loss. The loss-power density p for dielectric heating, based on the volume of material, is $$\rho = \omega \cdot \varepsilon" \cdot \varepsilon_0 \cdot E^2$$

By determining the dielectric loss of a mixture of materials it is therefore possible to determine what proportion of the electrical energy of the alternating field applied is converted into thermal energy.

The dielectric loss of the mixtures A) to F) can be determined by using a measurement chamber composed of an exterior and interior metal cylinder. The structure corresponds to that of a cylindrical capacitor where the basal surfaces of the exterior and the interior cylinder lie in the same plane and the two cylindrical surfaces (internal side of the exterior cylinder and external side of the interior cylinder) are coaxial. The mixture to be tested is charged to the annular intervening space between the exterior (interior diameter 9.5 cm) and interior (external diameter 5 cm) metal cylinder. The material is charged to a height of 11.9 cm. An alternating electrical field is applied to the cylindrical capacitor and the dielectric response is determined by measuring the current flowing through the mixture of materials. An LCR meter or an impedance analyzer can be used for the measurement. The constituents of the dielectric loss are as follows: $\varepsilon"=\varepsilon"_{dip}+\varepsilon"_{LF}$, where $\varepsilon"_{dip}$ is the dipolar contribution and $\varepsilon"_{LF}$ is the conductivity contribution.

The dielectric loss is determined at the frequency that is used for the heating in step d), either by direct determination at this frequency or by using conventional extrapolation methods to determine the value.

The process of the invention can be carried out as follows:
Step a)

Components A), B), C), D), E) and F) (composition of the core) and optionally components G), H), I), J) and K) (composition of the outer layers) are generally mixed in separate mixing procedures, where the respective general procedure is that the lignocellulose particles [component A) and, respectively, component G)] are first charged and the remaining components B), C), D), E) and F) and, respectively, H), I), J) and K) are added in any desired sequence. In a preferred embodiment, component B) is first added to component A), and then components C), D), E) and F) are added in any desired sequence. It is also possible to premix components separately before they are added. By way of example, it is possible that component A) is first charged and optionally mixed with component B), and that a mixture of components C), D), E) and F), or a mixture of C) and D) is then added, followed by a mixture of E) and F).
Step b)

For the single-layer lignocellulose material, the resultant mixture of components A), B), C), D), E) and (F) is scattered to give a mat. The total quantity of the mixture used here is determined via the target density, the target thickness and the target format of the lignocellulose material to be produced.

For the multilayer lignocellulose material, the resultant mixture of components A), B), C), D), E) and F) and the mixture(s) of components G), H), I), J) and K) are scattered onto one another to give a mat, thus giving the structure of the invention comprising the multilayer lignocellulose materials [according to the sequence (1), (2), (3)]. The general procedure here is that the lower outer layers are scattered, beginning with the outermost outer layer and continuing as far as the lower outer layer closest to the core, these being followed by the core layer and then the upper outer layers, beginning with the upper layer closest to the core and continuing as far as the outermost outer layer, preference being given to scattering of one lower outer layer, this being followed by the core layer and then the upper outer layer.

The total quantity used of the two mixtures is determined via the target density, the target thickness and the target format of the lignocellulose material to be produced. The ratio of the total mass of the scattered quantity of the mixture of components A), B), C), D), E) and F) for the core to the total mass of the scattered quantity of the mixture(s) of components G), H), I), J) and K) for the outer layers is generally from 100:1 to 0.25:1, preferably from 10:1 to 0.5:1, particularly preferably from 6:1 to 0.75:1, in particular from 4:1 to 1:1

This is generally achieved by scattering the mixtures directly by way of example onto a shaping belt.

Scattering can be carried out by methods known per se, for example mechanical scattering, or pneumatic scattering, or by way of example with roller systems (see by way of example M. funky, P. Niemz, Holzwerkstoffe and Leime [Wood materials and glues], pp. 119-121, Springer Verlag Heidelberg, 2002), batchwise or continuously, preferably continuously.
Step c)

After the scattering of each individual layer, compaction can take place. In the case of the multilayer lignocellulose materials, it is preferable that the compaction is carried out after scattering of all of the layers onto one another.

The compaction in step c) can generally be carried out before, during and/or after step d).

The compaction in step c) can take place in one, two or more steps. Available options here are heating by application of a high-frequency electrical field (step d)) before the first of these steps, between these steps, after the last of these steps or during one, two or more of these steps. In a preferred embodiment, the scattered mat is compacted in one or more steps and then heated by application of a high-frequency electrical field, where a further, or no further, preferably no further, compaction step is carried out during this heating. If a further compaction step takes place within the step d) after the high-frequency electrical field has been switched on (i.e. after the juncture Z), it is then preferable that said step takes place without further temperature increase in the core. The heating to elevated temperature in the step d) preferably takes place during and/or after, particularly preferably after, the compaction or, respectively, the final compaction step.

The compaction step(s) taking place in the step c) is/are characterized in that the temperatures of those surfaces of the compaction device that are in contact with the mat to be compacted and that exert a pressure on the mat are from 10 to 110° C., preferably from 15 to 90° C., particularly from 20 to 75° C. and very particularly preferably from 25 to 60° C. The compaction step(s) taking place in step c) generally take(s) place at a pressure of from 1 to 30 bar, preferably from 2 to 25 bar, particularly preferably from 3 to 20 bar. The compaction, or the compaction steps, generally lead(s) to a mat with depth at the juncture Z of from 20 to 80%, preferably from 25 to 70%, particularly preferably from 27.5 to 60%, very particularly from 30 to 50%, of the depth of the mat immediately after scattering of the mat.

Step d)

The energy for the heating of the mat is introduced by applying a high-frequency electrical field.

The mat is heated here in a manner such that at the juncture Z the temperature of the layer of the core is at least 90° C. and this temperature is reached in less than 40 s/mm d after the application of the high-frequency electrical field, where d is the thickness of the sheet at the juncture Z.

The average residence time during which the high-frequency electrical field acts on the mat is generally less than 40 seconds, preferably less than 20 seconds, particularly preferably less than 12.5 seconds, in particular less than 7.5 seconds, very particularly preferably less than 5.5 s per nm of sheet thickness d, where d is the thickness of the sheet at the juncture Z.

During this time, the binder(s) used harden(s), and therefore after this step d) the board has adequate strength. No further heated-press step is required in the process of the invention in order to achieve adequate strength, but it is possible to carry out such a step in order by way of example to achieve further compaction of the exterior regions of the wood-based board.

The temperature in the core (or in the single layer) at the juncture Z, i.e. when the high-frequency electrical field is switched off, is at least 90° C., i.e. from 90 to 170° C., preferably at least 100° C., i.e. from 100 to 170° C., particularly preferably at least 110° C., i.e. from 110 to 170° C., in particular at least 120° C., i.e. from 120 to 170° C.

The high-frequency electrical field applied can be microwave radiation or a high-frequency electrical field which arises between the two capacitor plates when a high-frequency alternating voltage has been applied to a plate capacitor.

Suitable frequencies for the high-frequency electromagnetic fields are from 100 kHz to 30 GHz MHz, preferably from 6 MHz to 3 GHz, particularly from 13 MHz to 41 MHz, in particular the respective nationally or internationally available frequencies such as 13.56 MHz, 27.12 MHz, 40.68 MHz, 2.45 GHz, 5.80 GHz, 24.12 GHz, and particularly preferably 13.56 and 27.12 MHz.

The electrical power required in the process of the invention is generally from 10 to 10 000 kWh, preferably from 100 to 5000 kWh, particularly preferably from 500 to 2000 kWh.

The electrical field strength required for heating in the high-frequency electromagnetic field in the process of the invention is generally from 0.1 to 10 000 V/mm, preferably from 1 to 2000 V/mm, particularly preferably from 10 to 500 V/mm.

The nominal power level of the high-frequency generators, based on the area of the mat that is heated in the high-frequency field (i.e. the area of the mat on which the alternating electrical field acts), is generally from 10 to 200 $kW/m^2$, preferably from 20 to 120 $kW/m^2$, particularly preferably from 25 to 100 $kW/m^2$, particularly preferably from 30 to 80 $kW/m^2$. The efficiency level (ratio of effective power level to nominal power level) here is generally from 25 to 80%, preferably from 40 to 80%, particularly preferably from 50 to 80%.

In a particularly preferred embodiment, a precompaction step can first be carried out, and can be followed by heating via application of a high-frequency high-voltage field. This procedure can take place either continuously or batchwise, preferably continuously.

To this end, the scattered and compacted mat can be passed by means of a conveyor belt through a region between plate capacitors in parallel arrangement.

A device for a continuous process for realizing the heating via application of a high-frequency electrical field after compaction within the same machine is described by way of example in WO-A-97/28936.

The heating immediately after the compaction step can also take place in a high-frequency press operating batchwise, e.g. in a high-frequency press such as the HLOP 170 press from Hoefer Presstechnik GmbH.

If the heating takes place after compaction, expansion of the mat during heating can be suppressed, minimized or prevented by carrying out the heating in a space which has restricted depth and height. The design of the restriction surfaces here is such that energy can be introduced. The design of the restriction surfaces is optionally such that they exert, onto the mat, a pressure sufficiently great to prevent expansion during heating.

In a particular embodiment of a continuous process, these restriction surfaces are press belts which are driven by rollers. The plates of the capacitors are arranged behind these press belts. The mat here is passed through a pair of capacitor plates, one of the press belts here being between mat and upper capacitor plate and the other press belt here being between mat and lower capacitor plate. One of the two capacitor plates can be grounded; the high-frequency heating then operates with asymmetric feed.

In the case of the multilayer lignocellulose materials, the temperature of the outer layers DS-A and DS-C at the juncture Z can differ from that of the core-B. The temperature difference is generally from 0 to 20° C., preferably from 0 to 10° C., particularly preferably from 0 to 5° C.

The temperature data are based on measurements made at juncture Z. The temperature of the core-B and of the outer layers DS-A and DS-C here means respectively the temperature in the middle of the respective layer. The measurement is therefore made in the plane of the core-B (and, respectively, of the outer layer(s) DS-A and, respectively, the outer layer(s) DS-C), wherein said plane is parallel to the surfaces of the mat and that above said plane and below said plane respectively the same volume of mixtures A) to F) (and, respectively, G) to K)) is present within the respective layer.

This measurement can be made as follows:

Immediately after the step b), a temperature-measurement sensor is introduced into each layer of the mat in such a way that the tip of the measurement sensor is in each case in the middle of the layers. The measurement sensors are advantageously introduced parallel to the planes described in the preceding paragraph. By way of example in the case of a three-layer mat composed of an upper outer layer DS-A, of a core-B and of a lower outer layer DS-C (which corresponds to the outer layer DS-A in terms of composition and quantity) and where after step b) the thickness of the outer layers DS-A and DS-C is by way of example 4 mm and the thickness of the core-B is 10 mm, a temperature sensor is introduced at a height of 2 mm (calculated from the base of the mat) for the temperature of DS-C, a temperature sensor is introduced at a height of 9 mm for the temperature of the core-B and a temperature sensor is introduced at a height of 16 mm for the temperature of the outer layer DS-A.

After the step d), transverse tensile strengths of the boards are generally more than 0.1 N/mm$^2$, preferably more than 0.2 N/mm$^2$, particularly preferably more than 0.3 N/mm$^2$ (transverse tensile strengths in accordance with EN 319).

The strength of the boards of lignocellulose materials after the step d) is sufficiently high to require no further introduction of heat. It is preferable that after the step d) no further compaction step takes place (compaction at low temperature as substep of the step c) or compaction at high temperature as step e)).

Step e)

The compaction step(s) taking place in the step e) is/are characterized in that those surfaces of the compaction device that are in contact with the semifinished sheet obtained from the steps c) and d) and that exert a pressure on the sheet of lignocellulose material obtained after the steps c) and d), have been heated and have temperatures of from 120 to 300° C., preferably from 140 to 280° C., particularly preferably from 150 to 250° C.

A pressure of from 1 to 50 bar, preferably from 3 to 40 bar, particularly preferably from 5 to 30 bar, is used here to give lignocellulose materials of the desired thickness. Any of the processes known to the person skilled in the art can be used (see examples in "Taschenbuch der Spanplatten Technik" [Handbook of particle board technology] H.-J. Deppe, K. Ernst, 4th edn. 2000, DRW—Verlag Weinbrenner, Leinfelden-Echterdingen, pp. 232-254, and "MDF—Mitteldichte Faserplatten" [MDF—medium-density fiberboard] H.-J. Deppe, K. Ernst, 1996, DRW—Verlag Weinbrenner, Leinfelden-Echterdingen, pp. 93-104). It is preferable to use continuous press processes, for example using twin-belt presses. Press time in step e) is normally from 0.1 to 5 seconds per mm of board thickness, preferably from 0.1 to 3 seconds per mm of board thickness, particularly preferably from 0.1 to 1 seconds per mm of board thickness.

In a preferred embodiment, in which after step d) one or more further compaction steps are carried out (compaction at low temperature as substep of the step c) and/or compaction at high temperature as step e)), the compaction factor V, derived from the quotient calculated from $d_v$ and $d_n$ (V=$d_v$/$d_n$), is from 1.01 to 1.15, preferably from 1.01 to 1.1, particularly preferably from 1.01 to 1.05. $d_v$ here is the thickness of the mat after the step d) and $d_n$ is the thickness of the board after the last of the compaction steps following step d).

It is preferable that no step e) takes place.

Step f)

After the step e) or—if no step e) takes place—after the step d) or—if after the step d) substeps of the step c) take place—after the step d), the resultant sheets of lignocellulose materials are cooled. That can be achieved by way of example by cooling in the stack after transfer into storage, or in a cooling wheel. Suitable devices and processes are described in M. Dunky, P. Niemz, Holzwerkstoffe und Leime [Wood-based materials and glues], pp. 868-869, Springer Verlag Heidelberg, 2002.

The components of the core A), B), C), D), E), F) and the components of the outer layers G), H), I), J), K) are defined below.

Components A) and G):

A suitable raw material for the lignocellulose particles A) and G) is any desired type of wood or a mixture of these, for example wood from spruce, beech, pine, larch, lime, poplar, eucalyptus, ash, chestnut or fir or a mixture, preferably wood from spruce or beech or a mixture of these, in particular wood from spruce. It is possible by way of example to use wood entities such as wood plies, wood strands, wood particles, wood fibers, wood dust or a mixture of these, preferably wood particles, wood fibers, wood dust or a mixture of these, particularly preferably wood particles, wood fibers or a mixture of these—as used for the production of particle board, MDF (medium-density fiberboard) and HDF (high-density fiberboard). The lignocellulose particles can also derive from woody plants such as flax, hemp, cereal or other annual plants, preferably from flax or hemp. It is particularly preferable to use wood particles as used in the production of particle board.

Starting materials for the lignocellulose particles are usually roundwood, lumber from forest-thinning, wood residues, waste lumber, industrial wood wastes, used wood, wastes from production of wood-based materials, used wood-based materials, and also lignocellulose-containing plants. Processes known per se can be used for treatment to give the desired lignocellulose-containing particles, for example wood particles or wood fibers (e.g. M. Dunky, P. Niemz, Holzwerkstoffe und Leime [Wood-based materials and glues], pp. 91-156, Springer Verlag Heidelberg, 2002).

The size of the lignocellulose particles can vary within wide limits.

If the lignocellulose particles A) and G) are lignocellulose fibers, the volume-weighted average fiber length of G) of the outer layers is then preferably smaller than or equal to the volume-weighted average fiber length of component A) in the core of the multilayer lignocellulose materials. The ratio of the volume-weighted average fiber lengths ($\bar{x}_{dimension}$) of component G) to the volume-weighted average fiber lengths ($\bar{x}_{dimension}$) of component A) can be varied within wide limits and is generally from 0.1:1 to 1:1, preferably from 0.5:1 to 1:1, particularly preferably from 0.8:1 to 1:1.

The volume-weighted average fiber length ($\bar{x}_{dimension}$) of component A) is generally from 0.1 to 20 mm, preferably from 0.2 to 10 mm, particularly preferably from 0.3 to 8 mm, very particularly preferably from 0,4 to 6 mm.

The volume-weighted average fiber length $\bar{x}_{dimension}$ is determined by means of digital image analysis. An example of equipment that can be used is a Camsizer® from Retsch Technology. The procedure here is that $x_{dimension}$ is determined for each individual fiber of a representative sample. $x_{dimension}$ is calculated from the area of the particle projection A and the Martin diameter $x_{Ma\_min}$. The applicable equation here is $x_{dimension} = x_{Ma\_min}/A$. The volume-weighted average value $\bar{x}_{dimension}$ is calculated from the individual values. The measurement method and the evaluation method are described in the Camsizer manual (Operating instructions/Manual for CAMSIZER® grain-size measurement system, Retsch Technology GmbH, version 0445.506, release 002, revision 009 of 25.06.2010).

If the lignocellulose particles A) and G) are lignocellulose strands or lignocellulose particles, it is then preferable that the volume-weighted average particle diameter of component G) of the outer layers is smaller than or equal to the volume-weighted average particle diameter of component A) in the core of the multilayer lignocellulose materials. The ratio of the volume-weighted average particle diameter $\bar{x}_{Fe\ max}$ of component G) to the volume-weighted average particle diameter $\bar{x}_{Fe\ max}$ of component A) can be varied within wide limits and is generally from 0.01:1 to 1:1, preferably from 0.1:1 to 0.95:1, particularly preferably from 0.5:1 to 0.9:1.

The volume-weighted average particle diameter $\bar{x}_{Fe\ max}$ of component A) is generally from 0.5 to 100 mm, preferably from 1 to 50 mm, particularly preferably from 2 to 30 mm, very particularly preferably from 3 to 20 mm.

The volume-weighted average particle diameter $\bar{x}_{Fe\ max}$ is determined by means of digital image analysis. An example of equipment that can be used is a Camsizer® from Retsch Technology. The procedure here is that $x_{Fe\ max}$ is determined for each individual lignocellulose strand or each individual lignocellulose particle of a representive sample. $X_{Fe\ max}$ is the largest Feret diameter of a particle (determined from various measurement directions). The volume-weighted average value $\bar{x}_{Fe\ max}$ is calculated from the individual values. The measurement method and the evaluation method are described in the Camsizer manual (Operating instructions/Manual for CAMSIZER® grain-size measurement system, Retsch Technology GmbH, version 0445,506, release 002, revision 009 of 25.06.2010).

If mixtures of wood particles and other lignocellulose particles are used, e.g. mixtures of wood particles and wood fibers, or of wood particles and wood dust, the proportion of wood particles in component A) and, respectively, in component G) is generally at least 50% by weight, i.e. from 50 to 100% by weight, preferably at least 75% by weight, i.e. from 75 to 100% by weight, particularly preferably at least 90% by weight, i.e. from 90 to 100% by weight.

The average densities of the lignocellulose particles A) and G) are mutually independently generally from 0.4 to 0.85 g/cm$^3$, preferably from 0.4 to 0.75 g/cm$^3$, in particular from 0.4 to 0.6 g/cm$^3$. These data are based on the standard envelope density after storage under standard conditions of temperature and humidity (20° C., 65% humidity).

The lignocellulose particles A) and G) can mutually independently comprise the usual small quantities of water from 0 to 10% by weight, preferably from 0.5 to 8% by weight, particularly preferably from 1 to 5% by weight (in a conventional small variation range from 0 to 0.5% by weight, preferably from 0 to 0.4% by weight, particularly preferably from 0 to 0.3% by weight). These data are based on 100% by weight of absolutely dry wood substance and describe the water content of the lignocellulose particles A) and, respectively, G) after drying (after application of the Darr method described above) immediately before mixing with the other components.

In another preferred embodiment, the outer layers use lignocellulose fibers as lignocellulose particles G) and the core uses lignocellulose strands or lignocellulose particles, particularly preferably lignocellulose particles, in particular lignocellulose particles with a volume-weighted average particle diameter $\bar{x}_{Fe\ max}$ of from 2 to 30 mm as lignocellulose particles A).

Componente B):

Suitable expanded plastics particles of component B) are preferably expanded thermoplastic particles with bulk density from 10 to 150 kg/m$^3$, preferably from 30 to 130 kg/m$^3$, particularly preferably from 35 to 110 kg/m$^3$, in particular from 40 to 100 kg/m$^3$ (determined by weighing of a defined volume filled with the particles).

Expanded plastic particles of component B) are generally used in the form of beads with average diameter from 0.01 to 50 mm, preferably from 0.25 to 10 mm, particularly preferably from 0.4 to 8.5 mm, in particular from 0.4 to 7 mm. In a preferred embodiment, the beads have a small surface area per unit volume, for example taking the form of a spherical or elliptical particle, and are advantageously closed-cell. The open-cell factor in accordance with DIN ISO 4590 is generally not more than 30%, i.e. from 0 to 30%, preferably from 1 to 25%, particularly preferably from 5 to 15%.

Suitable polymers on which the expandable or expanded plastics particles are based are generally of all the known polymers and mixtures of these, preferably thermoplastic polymers and mixtures of these, where these can be foamed. Examples of polymers of this type having good suitability are polyketones, polysulfones, polyoxymethylene, PVC (rigid and flexible), polycarbonates, polyisocyanurates, polycarbodiimides, polyacrylimides and polymethacrylimides, polyamides, polyurethanes, aminoplastic resins and phenolic resins, styrene homopolymers (also termed "polystyrene" or "styrene polymer" below), styrene copolymers, $C_2$- to $C_{10}$-olefin homopolymers, $C_2$- to $C_{10}$-olefin copolymers and polyesters. The olefin polymers mentioned are preferably produced by using 1-alkenes, for example ethylene, propylene, 1-butene, 1-hexene, or 1-octene.

It is moreover possible to add conventional additives to the polymers, preferably the thermoplastics, on which the expandable or expanded plastics particles of component B) are based, examples being UV stabilizers, antioxidants, coating agents, hydrophobizing agents, nucleating agents, plasticizers, flame retardants, and soluble and insoluble inorganic and/or organic dyes.

Component B) can usually be obtained as follows:

If an expandable medium (also termed "blowing agent") is used with suitable polymers, or if suitable polymers comprise an expandable medium, they can be expanded (another term often used being "foamed") via exposure to microwave energy, heat, hot air, or preferably steam, and/or pressure change (Kunststoff Handbuch [Plastics handbook] 1996, vol. 4 "Polystyrol" [Polystyrene], Hanser 1996, pp. 640-673 or U.S. Pat. No. 5,112,875). The general procedure here is that the blowing agent expands and the size of the particles increases, and cell structures arise. This expansion can be carried out in conventional foaming devices, often termed "prefoamers". These prefoamers can be fixed installations or else can be mobile. The expansion can be carried out in one stage or in a plurality of stages. The general procedure in the single-stage process is that the expandable plastics particles are simply expanded to the desired final size. The general procedure in the multistage process is that the expandable plastics particles are first expanded to an intermediate size and then are expanded in one or more further stages by way of an appropriate number of intermediate sizes to the desired final size. In contrast to the expanded plastics particles, the abovementioned plastics particles, also termed "expandable plastics particles" herein, generally comprise no cell structures. The expanded plastics particles generally have only a small content of blowing agent of from 0 to 5% by weight, preferably from 0.5 to 4% by weight, particularly preferably from 1 to 3% by weight, based on the total mass of plastic and blowing agent. The resultant expanded plastics particles can be placed into intermediate storage or can be used for the production of component B of the invention without any further intermediate steps.

Any of the blowing agents known to the person skilled in the art can be used for the expansion of the expandable plastics particles, examples being aliphatic $C_3$- to $C_{10}$- hydrocarbons, for example propane, n-butane, isobutane, n-pentane, isopentane, neopentane, cyclopentane and/or hexane and its isomers, alcohols, ketones, esters, ethers or halogenated hydrocarbons, preferably n-pentane, isopentane, neopentane and cyclopentane, particularly preferably a commercially available pentane isomer mixture made of n-pentane and isopentane.

The content of blowing agent in the expandable plastics particles is generally in the range from 0.01 to 7% by weight, preferably from 0.6 to 5% by weight, particularly preferably from 1.1 to 4% by weight, based in each case on the expandable plastics particles comprising blowing agent.

A preferred embodiment uses styrene homopolymer (also simply called "polystyrene" herein), styrene copolymer or a mixture of these as sole plastic in component B).

This polystyrene and/or styrene copolymer can be produced by any of the polymerization processes known to the person skilled in the art, see by way of example Ullmann's Encyclopedia, sixth edition, 2000 Electronic Release or Kunststoff-Handbuch [Plastics handbook] 1996, vol. 4 "Polystyrol" [Polystyrene], pp. 567-598.

The expandable polystyrene and/or styrene copolymer is generally produced in a manner known per se by suspension polymerization or by means of extrusion processes.

In suspension polymerization, styrene can be polymerized by means of free-radical-forming catalysts, optionally with addition of further comonomers, in aqueous suspension in the presence of a conventional suspension stabilizer. The blowing agent and optionally other conventional additional substances can be concomitantly used as initial charge in the polymerization, or added during the course of the polymerization, or added to the mixture after the polymerization has ended. After polymerization has ended, the resultant expandable styrene polymers in the form of beads impregnated with blowing agent can be separated from the aqueous phase, washed, dried and sieved.

In the case of the extrusion process, the blowing agent can by way of example be mixed into the polymer by way of an extruder, and the material can be conveyed through a die plate and granulated under pressure to give particles or strands.

The preferred or particularly preferred expandable styrene polymers or expandable styrene copolymers described above have relatively low content of blowing agent. They are also termed "low-blowing-agent-content" polymers. U.S. Pat. No. 5,112,875, to which express reference is made herein, describes a process with good suitability for production of low-blowing-agent-content expandable polystyrene or expandable styrene copolymer.

As described, it is also possible to use styrene copolymers. These styrene copolymers advantageously have at least 50% by weight, i.e. from 50 to 100% by weight, preferably at least 80% by weight, i.e. from 80 to 100% by weight, of styrene in the polymer, based on the mass of the plastic (without blowing agent). Examples of comonomers that can be used are α-methylstyrene, ring-halogenated styrenes, acrylonitrile, acrylates or methocrylates of alcohols having from 1 to 8 C atoms, N-vinylcarbazole, maleic acid, maleic anhydride, (meth)acrylamides and/or vinyl acetate.

The polystyrene and/or styrene copolymer can advantageously comprise a small quantity of a chain-branching agent in the polymer, i.e. of a compound having more than one, preferably two, double bonds, for example divinylbenzene, butadiene and/or butanediol diacrylate. Quantities generally used of the branching agent are generally from 0.0005 to 0.5 mol %, based on styrene. It is also possible to use mixtures of various styrene (co)polymers. Styrene homopolymers or styrene copolymers having good suitability are glassclear polystyrene (GPPS), impact-resistant polystyrene (HIPS), anionically polymerized polystyrene and impact-resistant polystyrene (AIPS), styrene-α-methylstyrene copolymers, acrylonitrile-butadiene-styrene polymers (ABS), styrene-acrylonitrile (SAN), acrylonitrile-styrene-acrylate (ASA), methacrylate-butadiene-styrene (MBS), methyl methacrylate-acrylonitrile-butadiene-styrene (MABS) polymers and mixtures thereof and with polyphenylene ether (PPE).

Preference is given to use of plastics particles, particularly preferably styrene polymers or styrene copolymers, in particular styrene homopolymers with molar mass in the range from 70 000 to 400 000 g/mol, particularly preferably from 190 000 to 400 000 g/mol, very particularly preferably from 210 000 to 400 000 g/mol. These expanded polystyrene particles or expanded styrene copolymer particles can be further used for the production of the lignocellulose-containing material with or without further measures to reduce blowing agent content.

The expandable polystyrene or expandable styrene copolymer or the expanded polystyrene or expanded styrene copolymer usually has an antistatic coating.

Even after pressing to give the lignocellulose material, the expanded plastics particles of component B) are generally present in unmelted condition; this means that the plastics particles of component B) have generally not penetrated into the lignocellulose particles or impregnated same, but instead have been distributed between the lignocellulose particles. The plastics particles of component B) can usually be separated from the lignocellulose by physical methods, for example after comminution of the lignocellulose material.

The total quantity of the expanded plastics particles of component B), based on the dry composition of the lignocellulose particles A), is generally in the range from 0 to 25% by weight, preferably from 0 to 20% by weight, particularly preferably from 0 to 10% by weight, in particular 0% by weight.

Components C) and H)

The binders of component C) and, respectively, of component H) can be selected from the group consisting of aminoplastic resin and organic isocyanate having at least two isocyanate groups, where binders or binder mixtures of components C) and, respectively, H) used are preferably identical, particularly preferably in both cases aminoplastic resin. The weight data is based on solids content of the corresponding component (determined by evaporating the water at 120° C. within a period of 2 h by the method of Gunter Zeppenfeld, Dirk Grunwald, Kiebstoffe in der Holz- and Möbelindustrie [Adhesives in the wood and furniture industry], $2^{nd}$ edn., DRW—Verlag, p. 268) in the case of aminoplastic resins, and the isocyanate component per se, i.e. by way of example without solvent or emulsification medium, in the case of the isocyanate, in particular PMDI (polymeric diphenylmethane diisocyanate).

Aminoplastic resin used can be any of the aminoplastic resins known to the person skilled in the art, preferably those for the production of wood-based materials. These resins, and also production thereof, are described by way of example in Ullmanns Enzyklopädie der technischen Chemie [Ullmann's Encyclopedia of Industrial Chemistry], 4th revised and extended edition, Verlag Chemie, 1973, pp. 403-424 "Aminoplaste" [Aminoplastics] and Ullmann's Encyclopedia of Industrial Chemistry, vol. A2, VCH Verlagsgesellschaft, 1985, pp. 115-141 "Amino Resins" and also in M. Dunky, P. Niemz, Holzwerkstoffe and Leime [Wood-based materials and glues], Springer 2002, pp. 251-259 (UF resins) and pp. 303-313 (MUF and UF with small quantity of melamine). These are generally polycondensates of compounds having at least one carbamide group or amino group, optionally to some extent substituted with organic moieties (another term for the carbamide group being carboxamide group), preferably carbamide group, preferably urea or melamine, and of an aldehyde, preferably formaldehyde. Preferred polycondensates are urea-formaldehyde resins (UF resins), urea-formaldehyde resins (MF resins) and melamine-containing urea-formaldehyde resins (MUF resins), with particular preference urea-formaldehyde resins, for example Kaurit® glue products from BASF SE.

Suitable organic isocyanates are organic isocyanates having at least two isocyanate groups and mixtures of these, in particular any of the organic isocyanates known to the person skilled in the art and mixtures of these, preferably those for the production of wood-based materials or of polyurethanes. These organic isocyanates, and also the production thereof, are described by way of example in Becker/Braun, Kunststoff Handbuch [Plastics handbook], $3^{rd}$ revised edition, vol. 7 "Polyurethane" [Polyurethanes], Hanser 1993, pp. 17-21, pp. 76-88 and pp. 665-671.

Preferred organic isocyanates are oligomeric isocyanates having from 2 to 10, preferably from 2 to 8, monomer units and on average at least one isocyanate group per monomer unit, and mixtures of these. The isocyanates can be either aliphatic, cycloaliphatic or aromatic. Particular preference is given to the organic isocyanate MDI (methylenediphenyl diisocyanate) and the oligomeric organic isocyanate PMDI (polymeric methylenediphenylene diisocyanate), these being obtainable via condensation of formaldehyde with aniline and phosgenation of the isomers and oligomers produced during the condensation (see by way of example Becker/Braun, Kunststoff Handbuch [Plastics handbook], $3^{rd}$ revised edition, vol. 7 "Polyurethane" [Polyurethanes], Hanser 1993, p. 18, final paragraph to p. 19, second paragraph and p. 76, fifth paragraph), and mixtures of MDI and PMDI. Very particular preference is given to products in the LUPRANAT® range from BASF SE, in particular LUPRANAT® M 20 FB from BASF SE.

The organic isocyanate can also be an isocyanate-terminated prepolymer which is the reaction product of an isocyanate, e.g. PMDI, with one or more polyols and/or polyamines.

Polyols selected from the group of ethylene glycol, diethylene glycol, propylene glycol, dipropylene glycol, butanediol, glycerol, trimethylolpropane, triethanolamine, pentaerythritol, sorbitol and mixtures thereof can be used. Other suitable polyols are biopolyols, for example polyols from soy oil, rapeseed oil, castor oil and sunflower oil. Other suitable materials are polyether polyols which can be obtained via polymerization of cyclic oxides, for example ethylene oxide, propylene oxide, butylene oxide or tetrahydrofuran in the presence of polyfunctional initiators. Suitable initiators comprise active hydrogen atoms and can be water, butanediol, ethylene glycol, propylene glycol, diethylene glycol, triethylene glycol, diproylene glycol, ethanolamine, diethanolamine, triethanolamine, toluenediamine, diethyltoluenediamine, phenyldiamine, diphenylmethanediamine, ethylenediamine, cyclohexanediamine, cyclohexanedimethanol, resorcinol, bisphenol A, glycerol, trimethylolpropane, 1,2,6-hexanetriol, pentaerythritol, and mixtures thereof. Other suitable polyether polyols comprise diols and triols, for example polyoxypropylenediols and -triols and poly(oxyethylene-oxypropylene)diols and -triols, these being produced via simultaneous or successive addition reactions of ethylene oxides and propylene oxides using di- or trifunctional initiators. Other suitable materials are polyester polyols, for example hydroxy-terminated reaction products of polyols of the type already described above with polycarboxylic acids or with polycarboxylic acid derivatives, e.g. anhydrides of these, in particular with dicarboxylic acids or with dicarboxylic acid derivatives, for example succinic acid, dimethyl succinate, glutaric acid, dimethyl glutarate, adipic acid, dimethyl adipate, sebacic acid, phthalic anhydride, tetrachlorophthalic anhydride and dimethyl terephthalate, and mixtures thereof.

It is possible to use polyamines selected from the group of ethylenediamine, toluenediamine, diaminodiphenylmethane, polymethylene polyphenyl polyamines, aminoalcohols and mixtures thereof. Examples of aminoalcohols are ethanolamine and diethanolamine.

The organic isocyanate or the isocyanate-terminated prepolymer can also be used in the form of an aqueous emulsion which is produced by way of example via mixing with water in the presence of an emulsifier. The organic isocyanate or the isocyanate component of the prepolymer can also be a modified isocyanate, examples being carbodiimides, allophanates, isocyanurates and biurets.

Particular perference is given to polycondensates in which the molar ratio of aldehyde to amino group and, respectively, carbamide group optionally to some extent substituted with organic moieties is in the range from 0.3:1 to 1:1, preferably from 0.3:1 to 0.6:1, particularly preferably from 0.3:1 to 0.55:1, very particularly preferably from 0.3:1 to 0.5:1. If the aminoplastics are used in combination with isocyanates, the molar ratio of aldehyde to amino group and, respectively, carbamide group optionally to some extent substituted with organic moieties is in the range from 0.3:1 to 1:1, preferably from 0.3:1 to 0.6:1, particularly preferably from 0.3:1 to 0.45:1, very particularly preferably from 0.3:1 to 0.4:1.

The aminoplastic resins mentioned are usually used in liquid form, usually in the form of from 25 to 90% by weight solution, preferably in the form of from 50 to 70% by weight solution, preferably in the form of aqueous solution, but they can also be used in solid form.

The solids content of the liquid aqueous aminoplastic resin can be determined by the method described in Gunter Zeppenfeld, Dirk Grunwald, Kiebstoffe in der Holz- and Möbelindustrie [Adhesives in the wood and furniture industry], $2^{nd}$ edn., DRW—Verlag, p. 268.

The constituents of the binder of component C) and of the binder of component H) can be used per se alone, i.e. by way of example aminoplastic resin or organic isocyanate as single constituent of the binder of component C) or of the binder of component H). However, the resin constituents of the binder of component C) and, respectively, of the binder of component H) can also be used in the form of a combination of two or more constituents of the binder of component C) and, respectively, of the binder of component H). In a preferred embodiment, the core uses, as component C), and the outer layers use, as component H), respectively an aminoplastic resin or a combination of a plurality of aminoplastic resins. In a particularly preferred embodiment, the core uses, as component C), a combination of one or more aminoplastic resins and isocyanate, and the outer layers use, as component H), an aminoplastic resin or a combination of a plurality of aminoplastic resins.

The total quantity of the binder of component C), based on the dry mass of the lignocellulose particles A) in the mixture for the core, is in the range from 1 to 15% by weight, preferably from 2 to 12% by weight, particularly preferably from 3 to 10% by weight.

If the constituents of the binder of component C) are selected only from the group of the aminoplastic resins, the total quantity of the binder of component C), based on the dry mass of the lignocellulose particles A) in the mixture for the core, is in the range from 5 to 15% by weight, preferably from 6 to 12% by weight, particularly preferably from 7 to 10% by weight.

If the constituents of the binder of component C) are selected only from the group of the isocyanates, the total quantity of the binder of component C), based on the dry mass of the lignocellulose particles A) in the mixture for the core, is in the range from 1 to 6% by weight, preferably from 2 to 5% by weight, particularly preferably from 3 to 4% by weight.

If the constituents of the binder of component C) are selected from the group of the aminoplastic resins and from the group of the isocyanates (i.e. combinations of aminoplastic resin and isocyanate being used), the total quantity of the binder of component C), based on the dry mass of the lignocellulose particles A) in the mixture for the core is in the range of from 4 to 15% by weight, preferably from 5 to 12% by weight, particularly preferably from 6 to 10% by weight. In this case the total quantity of the isocyanate in the binder of component C), based on the dry mass of the lignocellulose particles A), is in the range from 0.05 to 3.5% by weight, preferably from 0.1 to 2% by weight, particularly preferably from 0.3 to 1% by weight.

The total quantity of the binder of component H), based on the dry mass of the lignocellulose particles G) in the mixture(s) for the outer layer(s), is in the range from 1 to 15% by weight, preferably from 2 to 14% by weight, particularly preferably from 3 to 12% by weight.

If the constituents of the binder of component H) are selected only from the group of the aminoplastic resins, the total quantity of the binder of component H), based on the dry mass of the lignocellulose particles G) in the mixture(s) for the outer layer(s), is in the range from 6 to 15% by weight, preferably from 7 to 14% by weight, particularly preferably from 8 to 12% by weight.

If the constituents of the binder of component H) are selected only from the group of the isocyanates, the total quantity of the binder of component H), based on the dry mass of the lignocellulose particles G) in the mixture(s) for the outer layer(s), is in the range from 1 to 6% by weight, preferably from 2 to 5% by weight, particularly preferably from 3 to 4% by weight.

If the constituents of the binder of component H) are selected from the group of the aminoplastic resins and from the group of the isocyanates (i.e. combinations of aminoplastic resin and isocyanate being used), the total quantity of the binder of component H), based on the dry mass of the lignocellulose particles G) in the mixture(s) for the outer layer(s) is in the range of from 5 to 15% by weight, preferably from 6 to 14% by weight, particularly preferably from 7 to 12% by weight. In this case the total quantity of the isocyanate in the binder of component H), based on the dry mass of the lignocellulose particles G), is in the range from 0.05 to 3.5% by weight, preferably from 0.1 to 2% by weight, particularly preferably from 0.3 to 1% by weight.

Component D) and I)

Components D) and I) used are respectively mutually independently different or identical, preferably identical, ammonium salts known to the person skilled in the art or a mixture of these. It is preferable that these ammonium salts are added to the binder component C) and, respectively, to component H) before they are brought into contact with the lignocellulose particles A) and, respectively, G).

Examples of suitable ammonium salts are ammonium chloride, ammonium hydrogensulfate, ammonium sulfate and ammonium nitrate. It is preferable to use ammonium sulfate or ammonium nitrate, particularly preferably ammonium nitrate.

Quantities used of components D) and I) are from 0 to 3% by weight, preferably from 0 to 2% by weight, particularly preferably from 0 to 1.5% by weight.

If component C) comprises one or more binders from the group of the aminoplastic resins, it is then preferable that the quantity used of component D) is from 0.1 to 3% by weight, particularly from 0.3 to 2% by weight, particularly from 0.5 to 1.5% by weight.

If component H) comprises one or more binders from the group of the aminoplastic resins, it is then preferable that the quantity used of component I) is from 0.1 to 3% by weight, particularly from 0.3 to 2% by weight, particularly from 0.5 to 1.5% by weight.

Component E) and J)

Components E) and, respectively, J) can comprise further additives that are commercially available and known to the person skilled in the art as component E) and, respectively, component J) mutually independently quantities of from 0 to 5% by weight, preferably from 0 to 3% by weight, particularly preferably from 0 to 1.5% by weight, of identical or different, preferably identical additives, with the proviso that these components do not comply with the definitions of any of the other components A), B), C), D), F), G), H), I) or K), examples being hydrophobizing agents such as paraffin emulsions, additional hardeners, pigments, for example carbon black, antifungal agents, and formaldehyde scavengers, for example urea or polyamines.

The expression "additional hardeners" (i.e. hardeners used in addition to the ammonium salts of components D) and I)) here means any of the chemical compounds of any molecular weight which bring about or accelerate the polycondensation of aminoplastic resin. A very suitable group of additional hardeners for aminoplastic resin is that of organic and inorganic acids, for example sulfuric acid, formic acid, maleic acid, and of acid-generating substances, for example aluminum chloride, aluminum sulfate and mixtures of these. If additional hardeners are used, the proportion by weight in % by weight, based on the lignocellulose particles A) is greater in the core than the proportion by weight in % by weight, based on the lignocellulose particles G), in the outer layers.

Component F) and K)

Component F) and component K) can be selected mutually independently from the group of the alkali metal salts or alkaline earth metal salts from the group of the sulfates, nitrates, halides and mixtures of these. The mixtures for the core and the mixtures for the outer layers comprise, as component F) or as component K), from 0.1 to 3% by weight, preferably from 0.2 to 2.5% by weight, particularly preferably from 0.25 to 2% by weight, of alkali metal salts or alkaline earth metal salts from the group of the sulfates, nitrates, halides and mixtures of these.

Examples of suitable alkali metal salts or alkaline earth metal salts from the group of the sulfates, nitrates or halides are lithium sulfate, lithium hydrogensulfate, lithium nitrate, lithium chloride, lithium bromide, sodium sulfate, sodium hydrogensulfate, sodium nitrate, sodium chloride, sodium bromide, potassium sulfate, potassium hydrogensulfate, potassium nitrate, potassium chloride, potassium bromide, magnesium sulfate, magnesium hydrogensulfate, magnesium nitrate, magnesium chloride, magnesium bromide, calcium sulfate, calcium hydrogensulfate, calcium nitrate, calcium chloride, calcium bromide or their mixtures, preferably lithium sulfate, lithium nitrate, lithium chloride, sodium sulfate, sodium nitrate, sodium chloride, potassium sulfate, potassium nitrate, potassium chloride and mixtures of these, particularly preferably lithium sulfate, lithium nitrate, sodium sulfate, sodium nitrate, potassium sulfate, potassium nitrate and mixtures of these, in particular sodium sulfate, sodium nitrate and mixtures of these, very particularly preferably sodium nitrate.

The alkali metal salts or alkaline earth metal salts from the group of the sulfates, nitrates and halides are generally used in the form of solution or solid, preferably in the form of solution. In another particular embodiment, the salts are mixed with the binder if the binder is an aqueous binder, e.g. aminoplastic resin. This can be achieved by addition of salt solution or solid, e.g. in the form of salt powder or salt granulate, particular preference being given to solid, and then mixing.

Use:

The process of the invention can produce single- and multilayer lignocellulose materials of varying type, particular preference being given to single- and multilayer particle board and single- and multilayer fiberboard, and with particular preference being given to single-layer particle board and single-layer fiberboard, in particular single-layer particle board.

The total thickness of the multilayer lignocellulose materials of the invention varies with the application sector and is generally in the range from 0.5 to 100 mm, preferably in the range from 10 to 40 mm, in particular from 15 to 20 mm.

The average overall density of the multilayer lignocellulose materials of the invention is generally from 100 to 700 kg/m$^3$, preferably from 150 to 490 kg/m$^3$, particularly preferably from 200 to 440 kg/m$^3$, in particular from 250 to 390 kg/m$^3$. The density is determined 24 hours after production in accordance with EN 1058.

The multilayer lignocellulose materials of the invention generally have almost homogenous density distribution perpendicularly to the plane of the board. The density profile of a board can be determined by way of absorption of incident X-ray radiation, for example by using DAX 5000 density profile measurement equipment from Grecon.

The difference between density maximum in the outer layers and density minimum in the core is at most 100 kg/m$^3$, preferably from 0 to 75 kg/m$^3$, particularly preferably from 0 to 50 kg/m$^3$, in particular from 0 to 25 kg/m$^3$.

The single-layer lignocellulose materials of the invention likewise have almost homogeneous density distribution perpendicularly to the plane of the board. The difference between maximal density and minimal density in the board is at most 100 kg/m$^3$, preferably from 0 to 75 kg/m$^3$, particularly preferably from 0 to 50 kg/m$^3$, in particular from 0 to 25 kg/m$^3$.

The lignocellulose materials produced by the process of the invention, in particular single-layer particle board and single-layer fiberboard, is used mainly in the construction industry, in the fitting-out of interiors, in shopfitting and construction of exhibition stands, as material for furniture and as packaging material.

In a preferred use, the lignocellulose materials produced by the process of the invention are used as internal plies for sandwich boards. The external plies of the sandwich boards here can be composed of a variety of materials, for example of metal such as aluminum or stainless steel, or of thin sheets of wood-based material, for example particle board or fiberboard, preferably highly compacted fiberboard (HDF), or of laminates, for example high-pressure laminate (HPL), or of furniture foils or of melamine films or of veneers.

In the construction industry, in the fitting-out of interiors and in shopfitting and construction of exhibition stands, the lignocellulose materials produced in the invention or the sandwich boards produced from these lignocellulose materials are used by way of example as roof paneling and wall paneling, infill, shuttering, floors, door inlays, partitioning or shelving.

In furniture construction, the lignocellulose materials produced by the process of the invention or the sandwich boards produced from these lignocellulose materials are used by way of example as support material for unit furniture, as shelving, as door material, as worktop, as kitchen front, or as elements in tables, chairs, and upholstered furniture.

EXAMPLES

Particle boards of the invention

Mixture 1 for particle board 1

459 g of Kaurit® 347 glue (BASF SE, solids content 67%) were mixed with 34.0 g of sodium nitrate, 22.5 g of 40% ammonium nitrate solution, 50.0 g of HydroWax® 140 (Sasol, solids content 60%) and 75.6 g of water, with stirring. This mixture was added to 3099 g (3000 g of dry material, 99 g of moisture) of sprucewood particles in a paddle mixer, and mixed. Water content of the finished mixture measured by the Darr method was 9.5%.

Mixture 2 for Particle Boards 2 to 4

412 g of Kaurit® 347 glue (BASF SE, solids content 67%) were mixed with 30.5 g of sodium nitrate, 20.3 g of 40% ammonium nitrate solution, 50.0 g of HydroWax® 140 (Sasol, solids content 60%) and 89.4 g of water, with stirring. This mixture was added to 3069 g (3000 g of dry material, 99 g of moisture) of sprucewood particles in a paddle mixer, and mixed. Water content of the finished mixture measured by the Darr method was 9.9%.

Determination of Dielectric Loss

Dielectric loss was determined on mixture 1. For this, the mixture was charged to a test chamber composed of an exterior and interior metal cylinder. The structure corresponds to that of a cylindrical capacitor where the basal surfaces of the exterior and the interior cylinder lie in the same plane and the two cylindrical surfaces (internal side of the exterior cylinder and external side of the interior cylinder) are coaxial. The mixture to be tested is charged to the annular intervening space between the exterior (inside diameter 9.5 cm) and interior (diameter 5 cm) metal cylinder. The material is charged to a height of 11.9 cm. An alternating electrical field is applied to the cylindrical capacitor and the dielectric response at various frequencies (1 kHz, 10 kHz, 100 kHz, 1 MHz, 10 MHz) is determined by measuring the current flowing through the mixture of materials. An HP 4192A LF impedance analyzer from Hewlett-Packard was used for this purpose. Dielectric loss E" was determined by extrapolation as 27.12 MHz for both mixtures.

ε" (mixture 1)=0.0258

Production of the particle board of the invention x g of the mixture 1 were scattered into a scattering frame (46×44 cm). The scattered mat was precompacted at room temperature for 60 seconds in the scattering frame at a specific pressure of 10 bar in a down-stroke press. Using a y mm mat here (depth after scattering), outgoing compacted depth was z mm. The scattering frame was then removed. For monitoring of the temperature profile in the middle of the sheet and in the middle of the outer layers, optical sensors were introduced into the edge of the mat, respectively into a horizontal hole in the center of the outer layers and of the core. Nonwoven separators were then provided to the upper and lower side of the mat, and this was compacted to 17.5 mm (particle board 1) or 20.0 mm (particle board 2 to 4) in a HLOP 170 press from Hoefer Presstechnik GmbH within a period of 2 s, and then heated by applying a high-frequency alternating field (27.12 MHz). After the time t, the temperature T in the core was measured and the press was opened. After conditioning (at 65% humidity and 20° C.) to constant mass, the thicknesses and densities (in accordance with EN 1058), and the transverse tensile strengths (in accordance with EN 319) of the resultant particle board was determined.

|  | Particle board 1 | Particle board 2 | Particle board 3 | Particle board 4 |
|---|---|---|---|---|
| x [g] | 2508 | 2407 | 1955 | 1517 |
| y [mm] | 120 | 105 | 90 | 65 |
| z [mm] | 55 | 55 | 40 | 30 |
| z in HF [mm] | 17.5 | 20 | 20 | 20 |
| T [° C.] | 130 | 130 | 130 | 130 |
| t [s] | 96 | 126 | 116 | 102 |
| Thickness [mm] | 17.9 | 19.8 | 19.5 | 19.2 |
| Density [kg/m$^2$] | 670 | 589 | 479 | 381 |
| Transverse tensile strength [N/mm$^2$] | 1.31 | 1.00 | 0.69 | 0.35 |

Reference particle board
Mixture 3

459 g of Kaurit® 347 glue (BASF SE, solids content 67%), 22.5 g of 40% ammonium nitrate solution, 50.0 g of HydroWax® 140 (Sasol, solids content 60%) and 75.6 g of water were mixed, with stirring. This mixture was added in a paddle mixer to 3099 g (3000 g of dry material, 99 g of moisture) of sprucewood particles, and mixed. Water content of the finished mixture measured by the Darr method was 9.7%.

Production of Reference Particle Board 2513 g of mixture 3 were scattered into a scattering frame (46×44 cm). The scattered mat was precompacted at room temperature for 60 seconds in the scattering frame at a specific pressure of 10 bar in a down-stroke press. Using a 100 mm mat here (depth after scattering), outgoing compacted depth was 50 mm. The scattering frame was then removed. Nonwoven separators were then provided to the upper and lower side of the mat, and this was cold-precompacted to 20 mm in an HLOP 170 press from Hoefer Presstechnik GmbH within a period of 2 s. An automatic transfer system was used to move the mat into a heated press from Hoefer, where it was pressed to a thickness of 17.5 mm at a temperature of 227° C. (press time 175 s).

After conditioning (65% humidity and 20° C.) to constant mass, thickness, density (in accordance with EN 1058) and transverse tensile strength (in accordance with EN 319) of the resultant particle board were determined in accordance with EN 319.
Thickness=17.9 mm
Density=678 kg/m$^2$
Transverse tensile strength =0.93 N/mm2

What is claimed is:

1. A process for the batchwise or continuous production of single-layer lignocellulose-based boards or of multilayer lignocellulose-based boards with a core and with at least one upper and one lower outer layer,
comprising the following steps:
   a) mixing of the components of the individual layer(s),
   b) layer-by-layer scattering of the mixtures to give a mat,
   c) compaction after the scattering of the individual layer(s),
   d) application of a high-frequency electrical field during and/or after the compaction and a thermal hardening of the binder(s) with the application of the high-frequency electrical field,
   e) then optionally hot pressing, and
   f) cooling the lignocellulose material,
where, in step a),
for the core or the single layer, the lignocellulose particles A) [component A)] are mixed with
   B) from 0 to 25% by weight of expanded plastics particles with bulk density in the range from 10 to 150 kg/m$^3$ [component B)],
   C) from 1 to 15% by weight of one or more binders selected from the group consisting of aminoplastic resin and organic isocyanate having at least two isocyanate groups [component C)],
   D) from 0 to 3% by weight of ammonium salts [component D)],
   E) from 0 to 5% by weight of additives [component E)] and
   F) from 0.1 to 3% by weight of alkali metal salts or alkaline earth metal salts from the group of the sulfates, nitrates, halides and mixtures of these [component F)],
wherein the % by weight values for components B)-F) are the weights of the respective components based on the dry weight of the lignocellulose particles A) [component A)], and optionally for the outer layers, the lignocellulose particles G) [component G)] are mixed with
   H) from 1 to 15% by weight of one or more binders selected from the group consisting of aminoplastic resin and organic isocyanate having at least two isocyanate groups [component H)],
   I) from 0 to 2% by weight of ammonium salts [component I)],
   J) from 0 to 5% by weight of additives [component J)] and
   K) from 0.1 to 3% by weight of alkali metal salts or alkaline earth metal salts from the group of the sulfates, nitrates, halides and mixtures of these [component K)],
wherein the % by weight values for components H)-K) are the weights of the respective components based on the dry weight of the lignocellulose particles G) [component G)], and
wherein at the juncture Z the temperature of the layer of the core or of the single layer is at least 90° C., and this temperature is reached in less than 40 s/mm·d after the application of the high-frequency electrical field, where d is the thickness of the sheet of lignocellulose material in mm at the juncture Z and
wherein the outer layers are present in the multilayer lignocellulose-based boards and the outer layers are not present in the single layer lignocellulose-based boards.

2. The process for the production of single- or multilayer lignocellulose materials according to claim 1, wherein the process is carried out continuously.

3. The process for the production of single- or multilayer lignocellulose materials according to claim 1, wherein the process is used for the production of single-layer lignocellulose materials.

4. The process for the production of single- or multilayer lignocellulose materials according to claim 1, wherein the temperature of the layer of the core, or of the single layer, at the juncture Z is from 90 to 170° C.

5. The process for the production of multilayer or single-layer lignocellulose materials according to claim 1, wherein the lignocellulose material comprises, in the core or in the single layer, from 0.2 to 2.5% by weight of component F).

6. The process for the production of multilayer or single-layer lignocellulose materials according to claim 1, wherein the density of the lignocellulose material is from 100 to 700 kg/m$^3$.

7. The process for the production of multilayer or single-layer lignocellulose materials according to claim 1, wherein the density of the lignocellulose material is from 250 to 390 kg/m$^3$.

8. The process for the production of multilayer lignocellulose materials according to claim 1, wherein the following condition is met:
component F)≥1.1·component K).

9. The process for the production of multilayer lignocellulose materials according to claim 1, wherein the following condition is met:
[component F)+component D)]≥1.1·[component K)+component I)].

10. The process for the production of multilayer lignocellulose materials according to claim 1, wherein the following condition is met:
component F)+1.1·component K).

11. The process for the production of multilayer lignocellulose materials according to claim 1, wherein the following condition is met:
[component F)+component D)]≤1.1·[component K)+component I)].

12. A single- or multilayer lignocellulose material produced by the process according to claim 1.

13. A single- or multilayer lignocellulose material with a core and optionally with at least one upper and one lower outer layer, where the core or the single layer comprises, based on the lignocellulose particles A) [component A)], the following components:
B) from 0 to 25% by weight of expanded plastics particles with bulk density in the range from 10 to 150 kg/m$^3$ [component B)],
C) from 1 to 15% by weight of one or more binders selected from the group consisting of aminoplastic resin and organic isocyanate having at least two isocyanate groups [component C)],
D) from 0 to 3% by weight of ammonium salts [component D)],
E) from 0 to 5% by weight of additives [component E)] and
F) from 0.1 to 3% by weight of alkali metal salts or alkaline earth metal salts from the group of the sulfates, nitrates, halides and mixtures of these [component F)],
wherein the % by weight values for components B)-F) are the weights of the respective components based on the dry weight of the lignocellulose particles A) [component A],
and optionally for the outer layers, based on the lignocellulose particles G) [component G)], the following components:
H) from 1 to 15% by weight of one or more binders selected from the group consisting of aminoplastic resin and organic isocyanate having at least two isocyanate groups [component H)],
I) from 0 to 2% by weight of ammonium salts [component I)],
J) from 0 to 5% by weight of additives [component J)] and
K) from 0 to 2% by weight of alkali metal salts or alkaline earth metal salts from the group of the sulfates, nitrates, halides and mixtures of these [component K)]
wherein the % by weight values for components H)-K) are the weights of the respective components based on the dry weight of the lignocellulose particles G) [component G] and wherein the outer layer are present in the multilayer lignocellulose material and the outer layers are not present in the single layer lignocellulose material.

14. A single- or multilayer lignocellulose material produced according to claim 13, wherein the lignocellulose material comprises, in the core or in the single layer, from 0.2 to 2.5% by weight of component F).

15. The multilayer lignocellulose material according to claim 13, wherein a density distribution perpendicularly to the plane of the board is almost homogeneous and the difference between density maximum in the outer layers and density minimum in the core is at most 100 kg/m$^3$.

16. The single-layer lignocellulose material according to claim 13, wherein a density distribution perpendicularly to the plane of the board is almost homogeneous and the difference between density maximum and density minimum in the single-layer lignocellulose material is at most 100 kg/cm$^3$.

17. A material for furniture or as packaging material which comprises the single- or multilayer lignocellulose materials according to claim 13.

18. An inner ply for sandwich boards which comprises the single- or multilayer lignocellulose materials according to claim 13.

19. A roof paneling or wall paneling, infill, shuttering, floors, door inlays, partitions or shelving or as support material for unit furniture, as door material, as worktop, as kitchen front, as outer layers in sandwich structures, or as elements in tables, chairs, and upholstered furniture which comprises the single- or multilayer lignocellulose materials according to claim 13.

20. The process for the production of multilayer lignocellulose materials according to claim 1, wherein the high-frequency electrical field is applied by microwave radiation or a high-frequency electrical field which arises between the two capacitor plates when a high-frequency alternating voltage has been applied to a plate capacitor.

* * * * *